United States Patent
Pedersen

(10) Patent No.: US 9,577,637 B2
(45) Date of Patent: Feb. 21, 2017

(54) STABILITY-ENHANCED PHYSICALLY UNCLONABLE FUNCTION CIRCUITRY

(71) Applicant: Altera Corporation, San Jose, CA (US)

(72) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 2 days.

(21) Appl. No.: 14/183,979

(22) Filed: Feb. 19, 2014

(65) Prior Publication Data

US 2015/0236698 A1 Aug. 20, 2015

(51) Int. Cl.
*H03K 19/003* (2006.01)
*H05K 13/00* (2006.01)

(52) U.S. Cl.
CPC .............. *H03K 19/00384* (2013.01)

(58) Field of Classification Search
None
See application file for complete search history.

(56) References Cited

U.S. PATENT DOCUMENTS

| | | | | |
|---|---|---|---|---|
| 3,702,921 A | * | 11/1972 | Thelen | 219/501 |
| 3,875,505 A | * | 4/1975 | Goldberg | 324/94 |
| 4,195,239 A | * | 3/1980 | Suzuki | G11C 11/4091 327/208 |
| 5,162,681 A | * | 11/1992 | Lee | 327/53 |
| 5,701,090 A | * | 12/1997 | Hidaka | H03K 19/00361 326/27 |
| 5,777,491 A | * | 7/1998 | Hwang et al. | 326/113 |
| 6,366,113 B1 | * | 4/2002 | Song | 326/24 |
| 7,417,468 B2 | * | 8/2008 | Verbauwhede | G06Q 20/341 326/112 |
| 8,274,306 B1 | * | 9/2012 | Garcia | 326/8 |
| 8,290,150 B2 | | 10/2012 | Erhart et al. | |
| 8,510,608 B2 | | 8/2013 | Futa et al. | |
| 2005/0073339 A1 | * | 4/2005 | Rho | 327/50 |
| 2007/0018694 A1 | * | 1/2007 | Chen et al. | 326/115 |
| 2007/0024262 A1 | * | 2/2007 | Seifu et al. | 323/313 |
| 2009/0085645 A1 | * | 4/2009 | Tanaka | 327/407 |
| 2011/0181315 A1 | | 7/2011 | Krishnan | |
| 2011/0215829 A1 | * | 9/2011 | Guajardo Merchan et al. | 326/8 |
| 2012/0007438 A1 | * | 1/2012 | Kuroda | 307/104 |
| 2012/0106235 A1 | * | 5/2012 | Christensen et al. | 365/149 |
| 2012/0183135 A1 | | 7/2012 | Paral et al. | |
| 2013/0194886 A1 | | 8/2013 | Schrijen et al. | |
| 2014/0035670 A1 | * | 2/2014 | Chi et al. | 330/253 |

* cited by examiner

*Primary Examiner* — Crystal L Hammond

(57) ABSTRACT

A Physically Unclonable Function circuit may include precharge circuitry that precharges an output. The precharge circuitry may include transistors of a first type such as N-type or P-type. Circuitry having only transistors of a second, different type may be coupled to the output. The circuitry may produce a signal at the output based on variations between the transistors of the second type. The circuitry may include first and second circuits such as first and second transistors of the second type that are cross-coupled. While the circuitry is producing the signal at the output, the precharge circuitry or any transistors not of the second type may be disabled or electrically disconnected from the output. In this way, the stability over time of the Physically Unclonable Function circuit may be improved, because only variations associated with transistors of the second type may be used in producing the signal.

26 Claims, 12 Drawing Sheets

STABILITY-ENHANCED PHYSICALLY UNCLONABLE FUNCTION CIRCUITRY

BACKGROUND

This relates to integrated circuits including Physically Unclonable Function (PUF) circuits. A PUF circuit has behavior that is determined by random physical variations such as within the integrated circuit or within the environment of the integrated circuit. The variations may depend on operating temperature, operating voltage, stress-related changes in transistor characteristics such as due to negative bias threshold instability (NBTI), accumulated environmental radiation effects, thermal noise, or other sources of variations. Due to these variations, two PUF circuits on different integrated circuits function differently even though the logic design and manufacturing steps for both integrated circuits may be the same. PUF circuits may, for example, be used to help differentiate between integrated circuits that are otherwise identical, because outputs of the PUF circuits are different.

Examples of PUF circuits include arbiter PUFs, ring-oscillator PUFs, butterfly PUFs, and static random access memory (SRAM) PUFs. These PUF circuits depend on variations in P-type and N-type transistors to produce different functionality. In general, they are dependent on gate-threshold variations in the P-type and N-type transistors. For example, variations in the gate threshold voltage of transistors in delay-based PUFs such as arbiter and ring oscillator PUF circuits change rising-edge and falling-edge path delays.

Threshold voltages and drive strengths of P-type and N-type transistors do not precisely track over all changes in operating conditions. For example, P-type and N-type transistors may exhibit different responses to changes in operating temperature and voltage. In addition, P-type and N-type transistors have different aging characteristics that affect transistor operations over the lifetime of the transistors. For example, negative bias threshold instability (NBTI) that affects P-type transistors is often different from, and more severe than, positive bias threshold instability (PBTI) for N-type transistors. In a scenario such as when the behavior of a PUF circuit depends on the relative strength between a P-type and an N-type transistor of nominally equal strength, the P-type transistor may be stronger than the N-type transistor under some operating conditions (e.g., producing a first output response), whereas the N-type transistor may be stronger than the P-type transistor under other operating conditions (e.g., producing a second output response). In other words, the functionality of the PUF circuit may be unstable.

SUMMARY

A stability-enhanced Physically Unclonable Function circuit may include precharge circuitry that precharges an output during a precharge phase. The precharge circuitry may include transistors of a first type such as N-type or P-type. Circuitry having only transistors of a second, different type may be coupled to the output. The circuitry may produce a signal at the output based on variations between the transistors of the second type. The circuitry may include first and second circuits such as first and second target transistors of the second type that are cross-coupled between complementary nodes and a discharge path for the first and second target transistors. While the circuitry is producing the signal at the output during a sensing phase, the precharge circuitry or any transistors not of the second type may be disabled or electrically disconnected from the output such that current through the complementary nodes only flows through the pair of target transistors. In this way, the stability over time of the Physically Unclonable Function circuit may be improved, because only variations associated with transistors of the second type may be used in producing the signal. The signal may, for example, uniquely identify the Physically Unclonable Function circuit even between copies of the Physically Unclonable Function circuit.

Further features of the invention, its nature and various advantages will be more apparent from the accompanying drawings and the following detailed description of the preferred embodiments.

DETAILED DESCRIPTION

The present invention relates to integrated circuits with Physically Unclonable Function (PUF) circuits. The integrated circuits may be programmable integrated circuits, dedicated integrated circuits, or integrated circuits including both programmable and dedicated circuitry. Programmable integrated circuits can be programmed by a user to implement a desired custom logic function. In a typical scenario, a logic designer uses computer-aided design (CAD) tools to design a custom logic circuit. When the design process is complete, the tools generate configuration data. The configuration data is loaded into programmable integrated circuit memory elements to configure the device to perform the functions of the custom logic circuit. In particular, the configuration data configures programmable interconnects, programmable routing circuits, and programmable logic circuits in the programmable integrated circuits. Dedicated integrated circuits may include application-specific integrated circuits, general purpose processor chips, application-specific processor chips, digital signal processor chips, or any desired dedicated integrated circuits.

Figure 1:
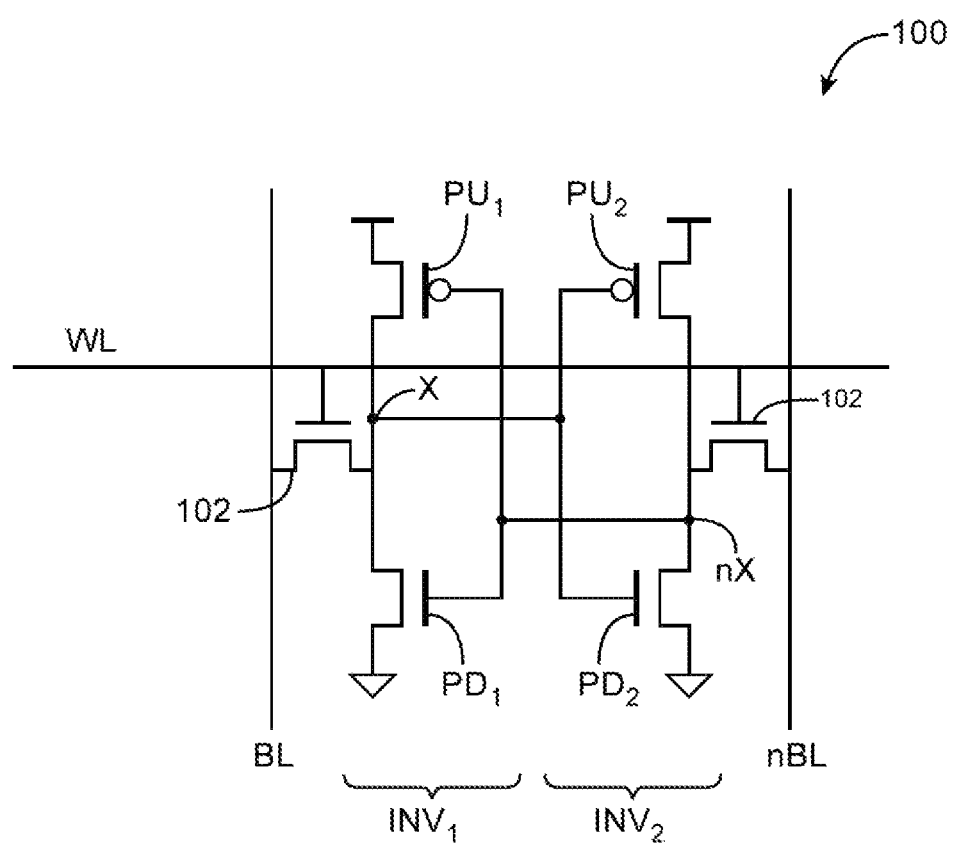
FIG. 1 is an illustrative diagram of a Physically Unclonable Function circuit implemented from a static random access memory (SRAM) cell.

FIG. 1 is a diagram of a static random access memory (SRAM) cell 100 that serves as a PUF circuit. As shown in FIG. 1, memory cell 100 includes a pair of cross-coupled inverters INV1 and INV2 that serves to store bit value X and inverted bit value nX. Inverter INV1 includes P-type transistor PU1 and N-type transistor PD1, whereas inverter INV2 includes P-type transistor PU2 and PD2. When enabled, transistors PU1 and PU2 serve to pull the internal data storage nodes of cell 18 high and are therefore referred to as pull-up transistors. When enabled, transistors PD1 and PD2 serve to pull the internal data storage nodes of cell 18 low and are therefore referred to as pull-down transistors. Cell 100 may include pass gates 102 that are connected between bit lines (BL and nBL) and the storage nodes of the cross-coupled inverters. To read the stored bit, the pass gates are enabled via word line WL.

Transistors PU1, PD1, PU2, and PD2 are nominally designed to have identical drive strength. However, due to variations such as manufacturing variations, the actual gate threshold voltage and therefore transistor drive strength of the transistors may be different from the nominal values. During initial conditions such as during start-up, the initial value stored at nodes X and nX depends on the relative strengths of the P-type transistors and the N-type transistors (i.e., the strength of the pull-up transistors relative to the pull-down transistors). The initial value stored at node X in cell 100 may therefore be random and based on variations in the transistors.

Over time, transistors PU1, PU2, PD1, and PD2 may age. For example, due to negative bias threshold instability, the drive strength of P-type transistors PU1 and PU2 may decrease over time. As another example, due to positive bias threshold instability, the drive strength of N-type transistors PD1 and PD2 may decrease over time. However, the relative decrease in drive strength of the P-type and N-type transistors over time may be different (e.g., as NBTI and PBTI are different). As a result, the unique value initially stored at node X may invert over time.

Figure 2:
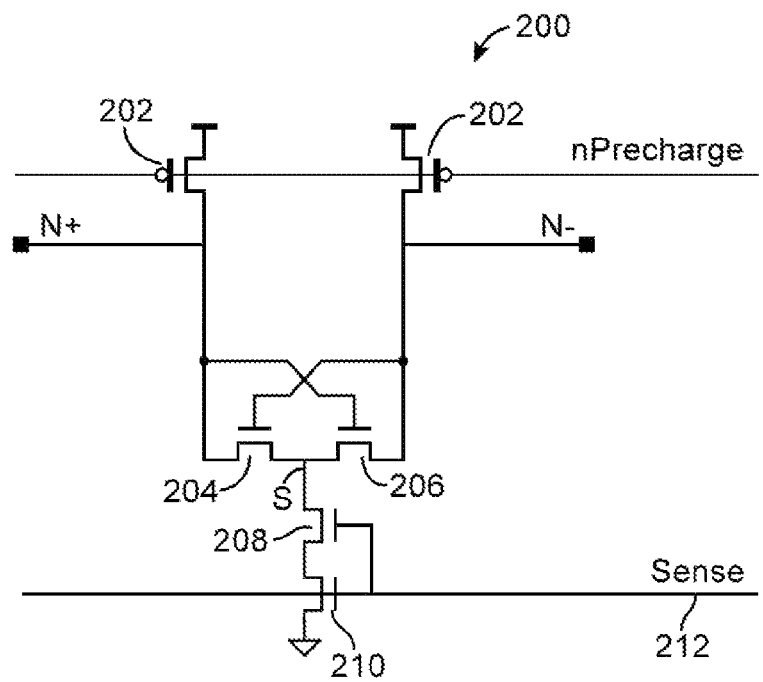
FIG. 2 is an illustrative diagram of a stability-enhanced Physically Unclonable Function circuit in accordance with one embodiment of the present invention.

FIG. 2 is a diagram of a PUF circuit 200 having improved stability. As shown in FIG. 2, PUF circuit 200 includes differential output nodes N+ and N−. Output nodes N+ and N− may be coupled to positive power supply terminals via precharge transistors 202. Output nodes N+ and N− may be coupled to common sink node S via respective transistors 204 and 206 (e.g., a pair of target transistors). Transistors 204 and 206 may be cross-coupled transistors such that the gate of transistor 204 is coupled to the drain of transistor 206 (and node N−), whereas the gate of transistor 206 is coupled to the drain of transistor 204 (and node N+). In the example of FIG. 2, precharge transistors 202 serve as complementary P-type transistors to N-type transistors 204 and 206. Transistors 204 and 206 may be, for example, minimum-sized transistors having minimum drive strength for a given process, which helps to ensure that transistor variations substantially affect the drive strength of transistors 204 and 206. In the example of FIG. 2, PUF circuit 200 produces an output signal that measures relative current between target circuit elements of only a given circuit element type (i.e., N-type transistors). If desired, PUF circuit 200 may measure relative current between any pair of target circuit elements of only a given circuit element type such as N-type transistors, P-type transistors, resistors, diodes, or other circuit element types. Common sink node S may be coupled to a ground power supply terminal via sense transistors 208 and 210. Sense transistors may be stacked and coupled in series between common sink node S and the ground power supply terminal. Sense transistors 208 and 210 may be controlled by a sense signal provided to the gate terminals of sense transistors 208 and 210 via path 212.

To read a bit value from PUF circuit 200, precharge transistors 202 may be initially enabled using the nPrecharge signal (e.g., by de-asserting nPrecharge), which precharges nodes N+ and N− (e.g., to a positive power supply voltage). Subsequently, precharge transistors 202 may be disabled (e.g., by asserting nPrecharge), which disconnects nodes N+ and N− such that the nodes are floating. Sense transistors 208 and 210 may then be enabled using the sense control signal, which enables current flow through transistors 204 and 206 that begin discharging nodes N+ and N−. Due to variations such as manufacturing variations, the current flow through transistor 204 may be different from the current flow through transistor 206. Consider the scenario in which transistor 204 has increased drive strength relative to transistor 206. In this scenario, transistor 204 may have increased current relative to transistor 206 even though the initial gate and source voltages of each transistor are identical. Therefore, the voltage at node N+ may decrease more rapidly than the voltage at node N− and transistor 206 may be disabled before transistor 204 (e.g., when the voltage at node N+ minus the voltage at common sink node S falls below the threshold voltage of transistor 206). The difference in voltages between nodes N+ and N− may have a substantially unique value that depends on variations between transistors 204 and 206 (e.g., random variations during manufacturing).

During sensing operations, only one type of transistor is active in PUF circuit 200. In the example of FIG. 2, only N-type transistors 204 and 206 are enabled while sense transistors 208 and 210 are enabled. In contrast, P-type precharge transistors 202 are disabled during this time. By enabling only one type of transistor during sensing operations, PUF circuit 200 may help improve stability of PUF circuit 200. For example, the effect of differences in aging over time between P-type and N-type transistors may be removed from the sensing operations, because P-type transistors 202 are only used to precharge nodes N+ and N− to the predetermined power supply voltage and only N-type transistors are used during PUF sensing operations. In this way, the unique response of PUF circuit 200 may be preserved over time.

Sense control transistors such as sense transistors 208 and 210 may be configured to limit the maximum current through transistors 204 and 206. By limiting the maximum current through transistors 204 and 206, sense transistors may help ensure that transistors 204 and 206 are operated in the sub-threshold current region of operation (e.g., the gate-to-source voltage may be less than the threshold voltage of the transistors). In the sub-threshold current region of operation, the relationship between the gate voltage of the transistors and the current through the transistors may be exponential. In this scenario, a change in voltage at the gate of transistor 204 may lead to an exponential change in the current drawn by transistor 204, and vice versa. In other words, operation in the sub-threshold current region may help improve amplification between cross-coupled transistors 204 and 206.

As an example, stacked transistors 208 and 210 may present a sufficiently high resistance such that the voltage at common sink node S is high enough to ensure that the gate-to-source voltages of transistors 204 and 206 are less than their threshold voltages. As another example, the voltage of the sense control signal provided to the gates of sense transistors 208 and 210 may be used to limit the current through transistors 204 and 206. The sense control signal may have a sufficiently low voltage that limits the current through transistors 208 and 210 and therefore limits the current through transistors 204 and 206.

Figure 3:
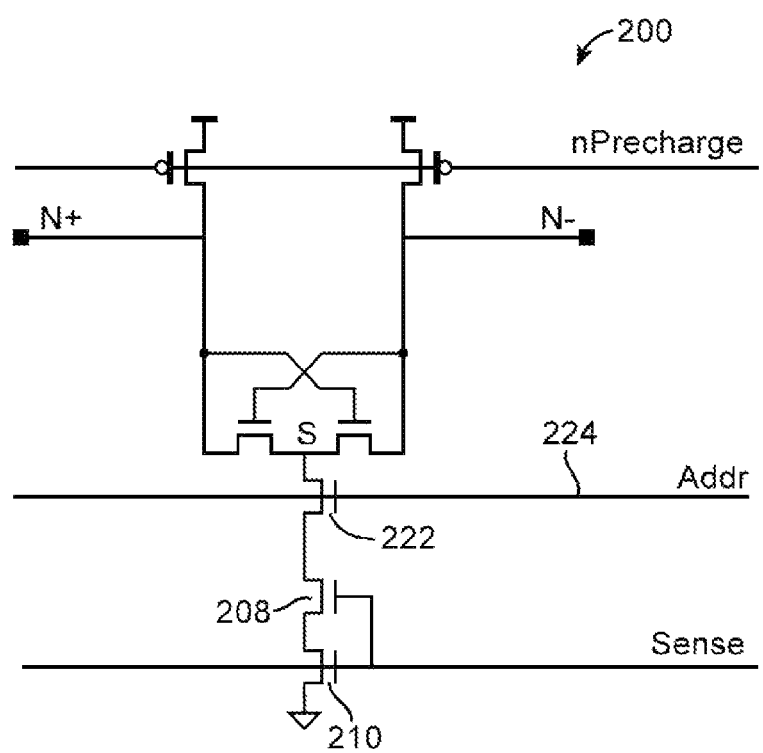
FIG. 3 is an illustrative diagram of a stability-enhanced Physically Unclonable Function circuit having an address transistor in accordance with one embodiment of the present invention.

If desired, PUF circuit 200 may be provided with an address transistor as shown in FIG. 3. Address transistor 222 may be coupled between common sink node S and sense transistors 208 and 210. The drain of address transistor 222 may be coupled to common sink node S, the source of transistor 222 may be coupled to the drain of stacked sense transistors 208 and 210, and the gate of transistor 222 may be coupled to address line 224. The gate of transistor 222 may receive an address signal (i.e., Addr) over address line 224 that controls transistor 222. Address transistor 222 may allow PUF circuit 200 to be enabled and disabled based on the address signal. For example, an array of rows and/or columns of PUF circuits 200 may be selectively operated by providing appropriate address signals to each of the PUF circuits.

Figure 4:
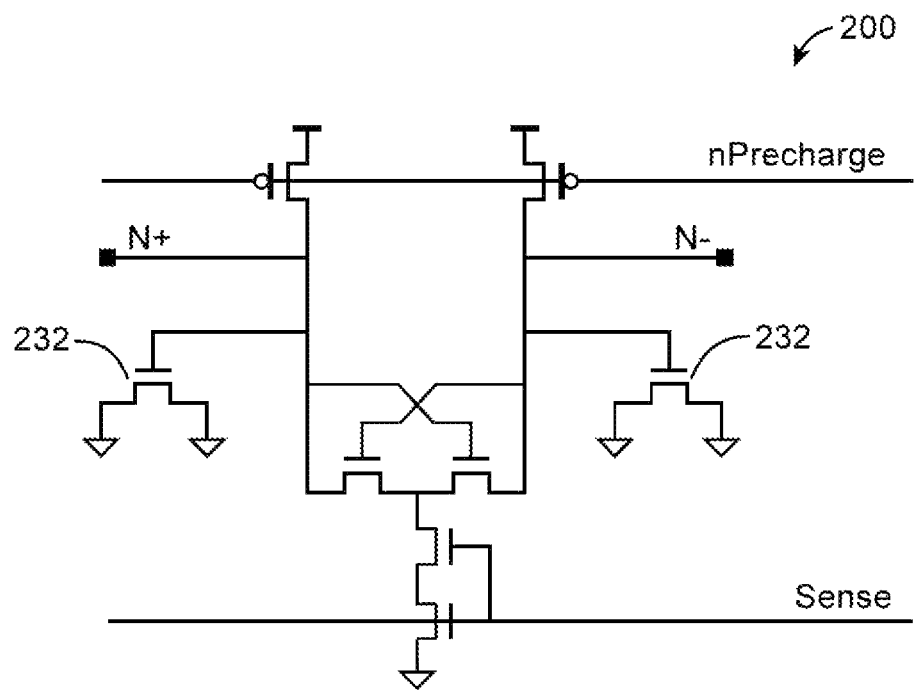
FIG. 4 is an illustrative diagram of a stability-enhanced Physically Unclonable Function circuit with additional output capacitance provided by N-type transistor-based capacitors in accordance with one embodiment of the present invention.

In general, it may be desirable to reduce or eliminate variations that can cause the functionality of PUF circuit 200 to change over time. Use of precharge operations helps to eliminate variations in time that are caused by differences between P-type and N-type transistor aging. Variations due to thermal noise may also undesirably affect the functionality of PUF circuit 200. For example, thermal noise of parasitic capacitances at nodes N+ and N− can cause the functionality of PUF circuit 200 to vary over time. The parasitic capacitances may be associated with parasitic transistor capacitances such as gate-to-source, drain-to-source, or other parasitic capacitances of transistors that are coupled to nodes N+ and N−. The thermal noise at each node may introduce voltage variations proportional to the inverse square root of the parasitic capacitance at that node. To help reduce thermal noise at output nodes N+ and N−, additional capacitance may be added to the nodes. FIG. 4 is an illustrative diagram showing how additional capacitance may be added to PUF circuit 200.

As shown in FIG. 4, an N-type transistor 232 may be coupled to output nodes N+ and N− to provide additional capacitance and help reduce thermal noise. Each N-type transistor may be configured in a capacitor arrangement in which the source and drain terminals of that transistor are connected to ground power supply terminals, whereas the gate of that transistor is coupled to a corresponding output node. In this capacitor arrangement, transistors 232 serve as metal-oxide-semiconductor (MOS) capacitors that are coupled between respective output nodes and power supply ground.

Figure 5:
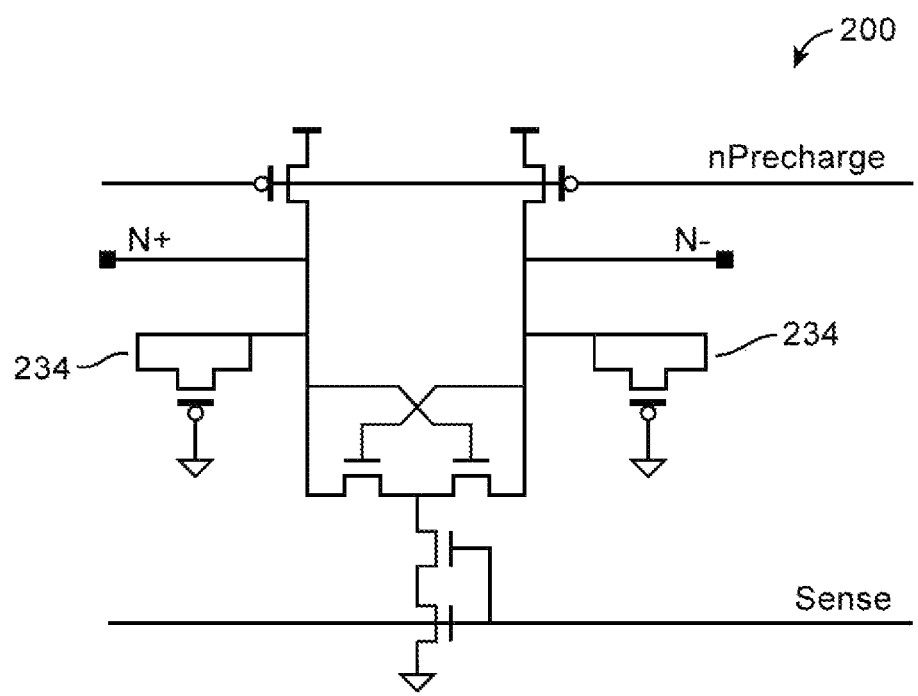
FIG. 5 is an illustrative diagram of a stability-enhanced Physically Unclonable Function circuit with additional output capacitance provided by P-type transistor-based capacitors in accordance with one embodiment of the present invention.

The example of FIG. 4 is merely illustrative. If desired, P-type transistors may be used in providing additional capacitance to output nodes N+ and N− as shown in FIG. 5. Each P-type transistor 234 of FIG. 5 may be configured in a capacitor arrangement in which the source and drain terminals of that transistor are connected to a respective output node and the gate terminal is coupled to a ground power supply terminal.

Figure 6:
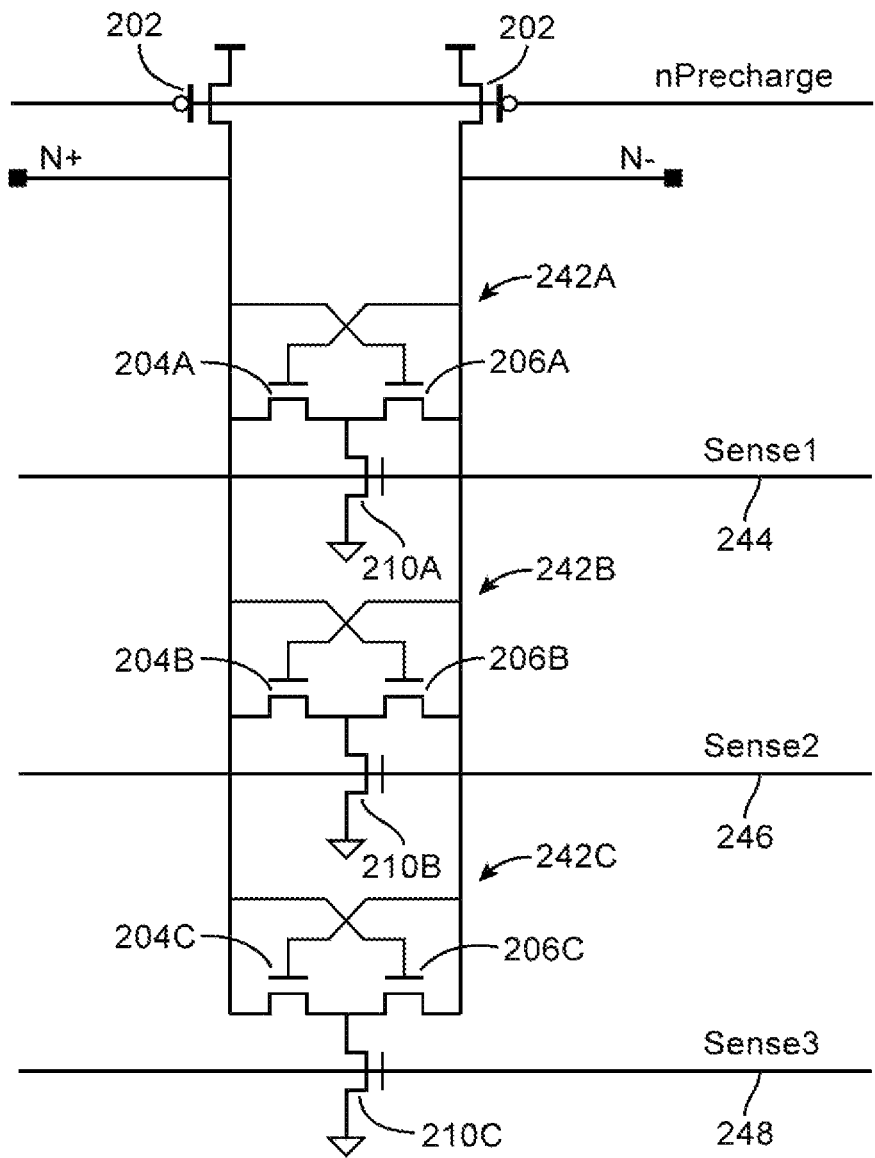
FIG. 6 is an illustrative diagram of multiple stability-enhanced Physically Unclonable Function circuits that share precharge circuitry in accordance with one embodiment of the present invention.

Multiple PUF circuits may be configured to share precharge circuitry as shown in FIG. 6. In the example of FIG. 6, multiple PUF circuits 242 (e.g., 242A, 242B, 242C) are coupled to output nodes N+ and N− and share precharge transistors 202. Each PUF circuit includes a pair of cross-coupled transistors and is enabled via a respective sense transistor. For example, PUF circuit 242A includes cross-coupled transistors 204A and 206A that are coupled to sense transistor 210A. Similarly, PUF circuit 242B includes transistors 204B, 206B, and 210B, whereas PUF circuit 242C includes transistors 204C, 206C, and 210C. Each of PUF circuits 242A, 242B, and 242C may operate similarly as PUF circuit 200 of FIG. 2 and may be selectively enabled and disabled by providing sense signals via respective paths 244, 246, and 248. For example, PUF circuit 242A may be operated by first precharging output nodes N+ and N− using shared precharge transistors 202 and subsequently asserting control signal Sense1 and de-asserting control signals Sense2 and Sense3 (e.g., enabling PUF circuit 242A while disabling PUF circuits 242B and 242C). PUF circuits 242B and 242C may be operated similarly to produce outputs on nodes N+ and N−.

The example of FIG. 6 in which each PUF circuit is provided with only one sense transistor (e.g., 210A, 210B, or 210C) is merely illustrative. If desired, each PUF circuit may be provided with a stacked transistor arrangement (e.g., as shown in FIG. 2). If desired, any number of PUF circuits may be provided with shared precharge circuitry.

Figure 7:
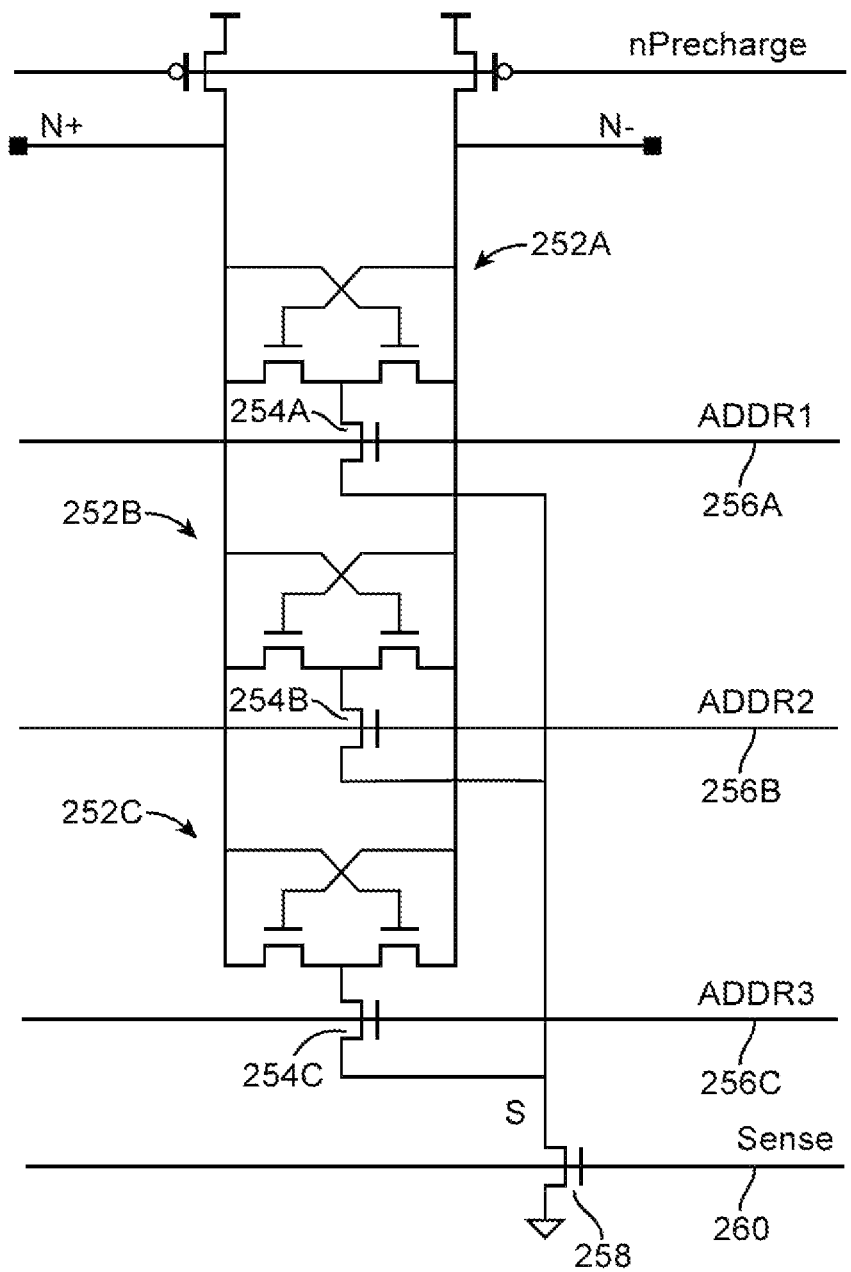
FIG. 7 is an illustrative diagram of multiple stability-enhanced Physically Unclonable Function circuits that share precharge circuitry and a sense transistor in accordance with one embodiment of the present invention.

The example of FIG. 6 in which each PUF circuit includes a respective sense transistor is merely illustrative. As shown in FIG. 7, multiple PUF circuits 252A, 252B, and 252C may be provided with a shared sense transistor 258 (or stacked sense transistors). For individual control, each PUF circuit may include an address transistor 254 (e.g., similar to FIG. 3). The address transistor of each PUF circuit may be controlled via a respective address signal provided on an address line. The gate of address transistor 254A may receive address signal ADDR1 on address path 256A, whereas address transistor 254A may be controlled by address signal ADDR2 on path 256B and address transistor 254C may receive address signal ADDR3 on path 256C. Address transistors 254A, 254B, and 254C may be sized smaller than sense transistors (e.g., with less drive strength), which may help to conserve limited integrated circuit area relative to arrangements such as FIG. 6 in which each PUF circuit is provided with a respective sense transistor.

Figure 8:
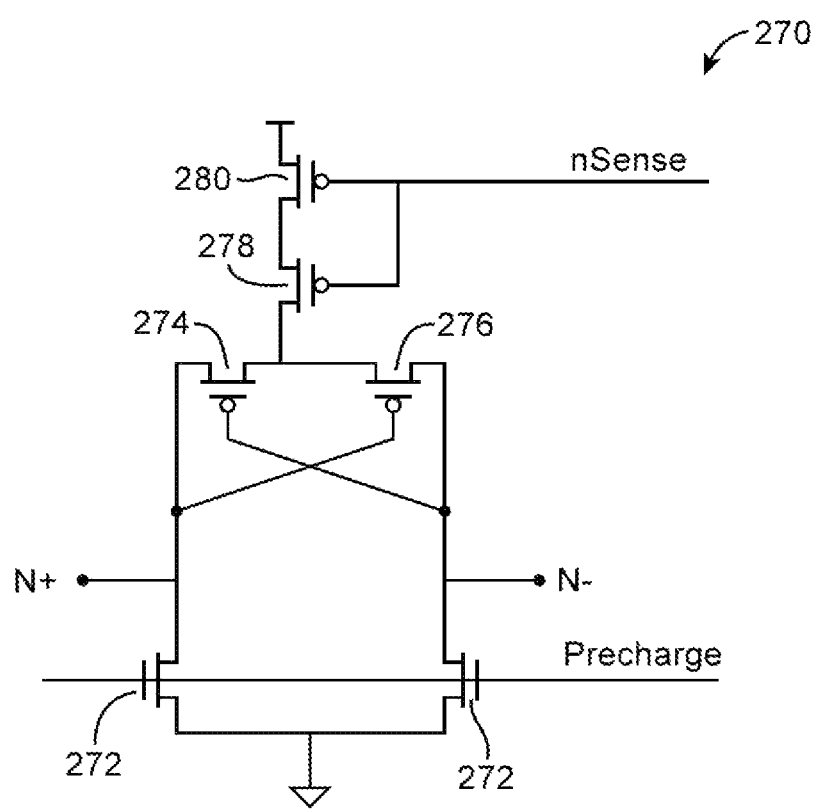
FIG. 8 is an illustrative diagram of a stability-enhanced Physically Unclonable Function circuit that produces a unique output signal based only on variations in P-type transistors in accordance with one embodiment of the present invention.

If desired, N-type and P-type transistors of any stability-enhanced PUF circuit may be inverted. FIG. 8 illustrates an arrangement for a PUF circuit 270 similar to PUF circuit 200 of FIG. 2 but with inverted transistor types. In other words, P-type precharge transistors 202, N-type cross-coupled transistors 204 and 206, and N-type sense transistors 208 and 210 may be replaced with N-type precharge transistors 272, P-type cross-coupled transistors 274 and 276, and P-type sense transistors 278 and 280. Control signals such as sense and nPrecharge signals of FIG. 2 may be accordingly inverted for use with transistors of inverted types (e.g., nSense and precharge signals of FIG. 8 are inverted versions of sense and nPrecharge signals of FIG. 2). In the inverted arrangement of FIG. 8, precharge transistors 272 set output nodes N+ and N− to a ground power supply voltage and cross-coupled transistors 274 and 276 subsequently pull output nodes N+ and N− towards the positive power supply voltage.

Figure 9:
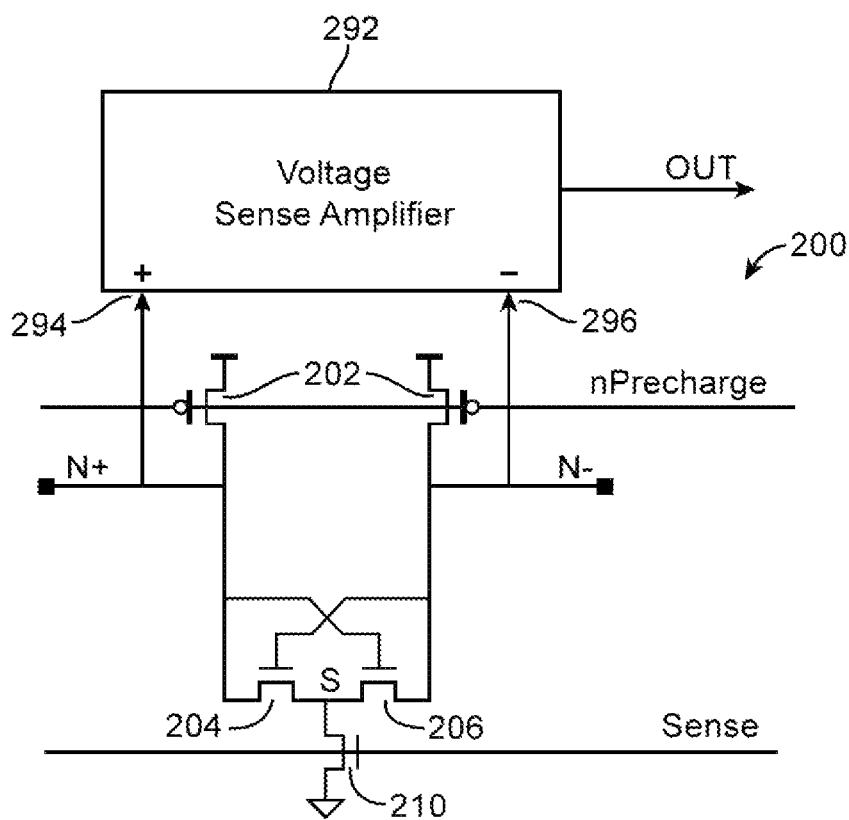
FIG. 9 is an illustrative diagram of an arrangement in which a voltage sense amplifier produces an output signal for a stability-enhanced Physically Unclonable Function circuit in accordance with one embodiment of the present invention.

Sensing circuitry may be coupled to output nodes of a PUF circuit and used to measure the unique response or value of the PUF circuit. FIG. 9 is an illustrative diagram showing how a voltage sense amplifier 292 may be used to measure the voltage across output nodes N+ and N− of a PUF circuit 200. Inputs 294 and 296 of voltage sense amplifier 292 may be coupled to output nodes N+ and N− of PUF circuit 200. Voltage sense amplifier may amplify the difference between the output voltages at nodes N+ and N− to produce output signal OUT.

Figure 10:
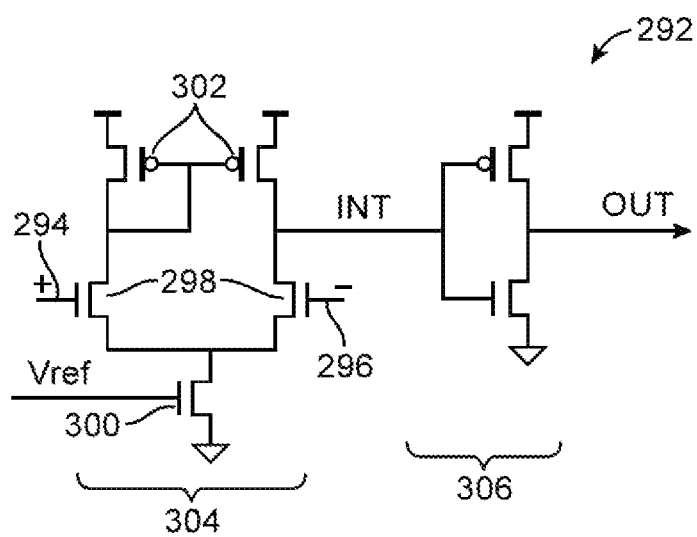
FIG. 10 is an illustrative diagram of a voltage sense amplifier that may be used to produce a voltage signal using a stability-enhanced Physically Unclonable Function circuit in accordance with one embodiment of the present invention.

FIG. 10 is an illustrative example of a voltage sense amplifier 292 that may be used in measuring the unique response of PUF circuit 200. As shown in FIG. 10, voltage sense amplifier 292 may include a differential amplifier 304 formed from a differential pair of transistors 298 that receive a differential input voltage signal (e.g., from output nodes N+ and N− of a PUF circuit). Transistors 298 may be coupled to positive power supply terminals via transistors 302 having shorted gates. Transistor 300 coupled between a ground power supply terminal and input transistors 294 and 296 may be biased by bias voltage Vref to serve as a current source for the differential amplifier. Differential amplifier 304 may amplify the differential input signals to produce inverted single-ended output signal INT. Output signal INT may be passed through inverter 306 (e.g., inverted) to produce output signal OUT.

Figure 11:
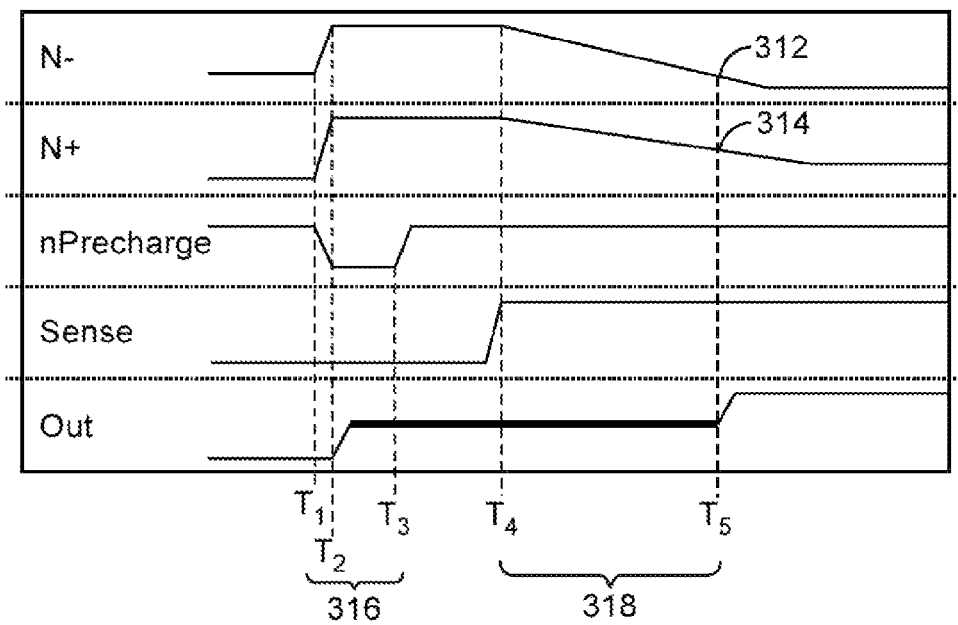
FIG. 11 is an illustrative timing diagram showing how a voltage sense amplifier and a stability-enhanced Physically Unclonable Function circuit may be operated to produce a value from transistor variations in accordance with one embodiment of the present invention.

The operations of PUF circuit 200 and voltage sense amplifier 292 of FIGS. 9 and 10 are illustrated in the exemplary timing diagram of FIG. 11. At time T1, the nPrecharge signal may be de-asserted (e.g., pulsed), which enables P-type precharge transistors 202 to pull the voltage at output nodes N+ and N− high (e.g., to the positive power supply voltage). Precharge operations (e.g., a precharge phase) may be performed during time period 316 between times T1 and T3. At time T2, the voltage at output nodes N+ and N− may have been pulled high. At time T3, the precharge signal may be asserted, which disables the precharge transistors and disconnects the output nodes from the positive power supply terminal.

At time T4, the sense signal may be asserted, which enables cross-coupled transistors 204 and 206 to begin drawing current from output nodes N+ and N−. Due to variations such as manufacturing variations, the current drawn by transistor 204 may be different from transistor 206. In the example of FIG. 11, the current drawn by transistor 206 may be greater than the current drawn by transistor 204 and therefore the voltage of output node N− may decrease more rapidly than output node N+. This example is merely illustrative. The current drawn by transistors 206 and 204 may be random and may uniquely characterize PUF circuit 200.

During time period 318 between times T4 and T5, sensing operations (e.g., a sensing phase) may be performed using sensing circuitry 292 of FIG. 9. During the sensing operations, the voltages at nodes N+ and N− may decrease as current is drawn by transistors 204 and 206. However, the voltage at node N− may decrease more rapidly than node N+, resulting in a positive difference between nodes N+ and N− that increases in magnitude over time. The voltage at intermediate node INT of sensing circuitry 292 may decrease correspondingly, because differential amplifier 304 is an inverting amplifier. At time T5, the difference in voltage between nodes N+ and N− may be sufficiently great as to cause the voltage at intermediate node INT to decrease below the inverting input threshold of inverter 306. Output OUT of voltage sense amplifier 292 may then be asserted (e.g., pulled high) by inverter 306.

The example of FIG. 11 in which the voltage at output node N− decreases more rapidly than the voltage at output node N+ is merely illustrative. In general, the voltages at nodes N− and N+ may decrease at rates based on variations in cross-coupled transistors 204 and 206. For example, in the scenario in which the voltage at output node N+ decreases more rapidly than the voltage at output node N−, the voltage at intermediate node INT may be increased, causing inverter 306 to produce a low output voltage. In this way, voltage sense amplifier 292 may read a unique value that characterizes PUF circuit 200.

Figure 12:
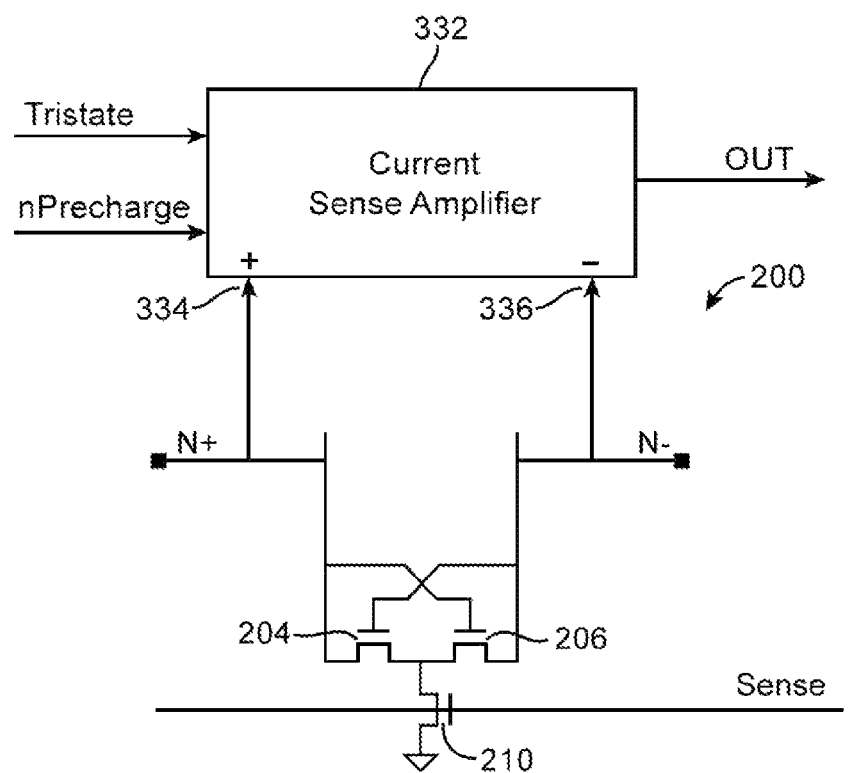
FIG. 12 is an illustrative diagram of an arrangement in which a current sense amplifier produces an output signal for a stability-enhanced Physically Unclonable Function circuit in accordance with one embodiment of the present invention.

If desired, sense circuitry may measure current at output nodes N+ and N− to identify a unique value that characterizes a PUF circuit. FIG. 12 is a diagram showing how a current sense amplifier 332 may be coupled to PUF circuit 200. In the example of FIG. 12, precharge circuitry such as precharge transistors 202 of FIG. 9 have been formed as a part of current sense amplifier 332. However, this is merely illustrative and precharge transistors 202 may be formed as shown in FIG. 9 (e.g., separately). Current sense amplifier 332 may include inputs 334 and 336 that are coupled to output nodes N+ and N−, respectively. Amplifier 332 may receive a tristate control signal (Tristate) and a precharge control signal (nPrecharge) that control amplifier 332 to convert measured current at nodes N+ and N− to produce output signal OUT.

Figure 13:
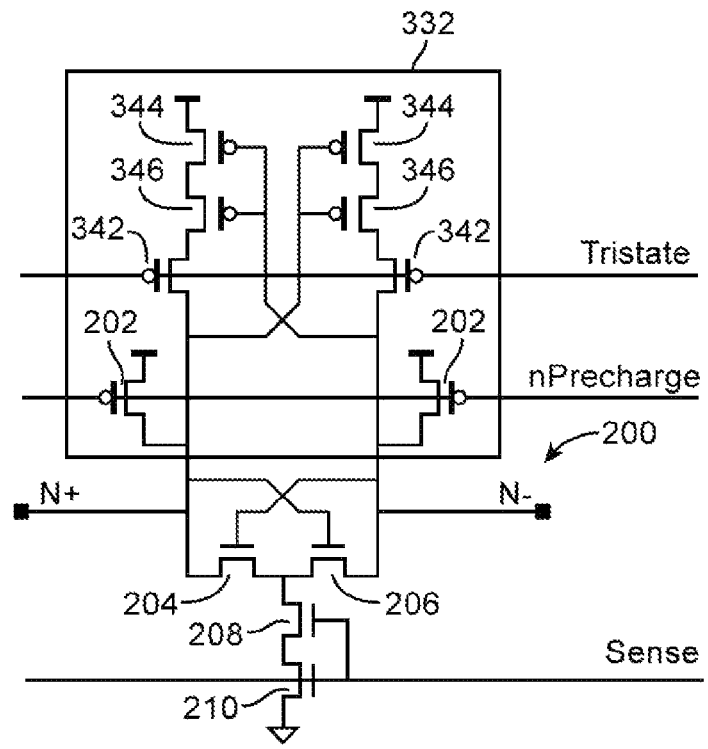
FIG. 13 is an illustrative diagram of an arrangement in which a current sense amplifier having tristate circuitry produces an output signal for a stability-enhanced Physically Unclonable Function circuit in accordance with one embodiment of the present invention.

FIG. 13 is a diagram of an illustrative current sense amplifier 332 that is coupled to a PUF circuit 200. As shown in FIG. 13, current sense amplifier 332 may include a cross-coupled latch formed from stacked transistors 344 and 346 (e.g., P-type transistors). The stacked arrangement of transistors 344 and 346 may help to reduce leakage current. If desired, the cross-coupled latch may be formed from a non-stacked arrangement by omitting transistors 346. Tristate transistors 342 may be coupled between the transistors of the cross-coupled latch and output nodes N+ and N−. Tristate transistors 342 may receive a tristate control signal (e.g., at a gate of the tristate transistors), which controls the tristate transistors to enable or disable current flow between output nodes N+ and N− of PUF circuit 200 and current sense amplifier 332.

Figure 14:
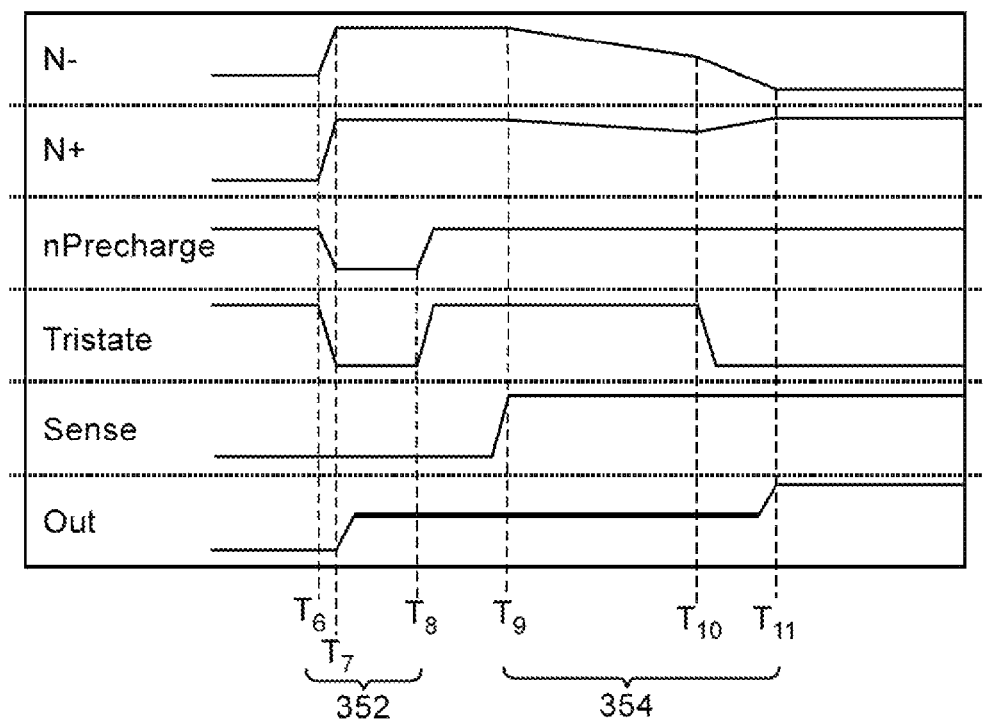
FIG. 14 is an illustrative timing diagram showing how a current sense amplifier and a stability-enhanced Physically Unclonable Function circuit may be operated to produce a value from transistor variations in accordance with one embodiment of the present invention.

FIG. 14 is a timing diagram illustrating operations of current sense amplifier 332 and PUF circuit 200 of FIG. 13 in measuring a unique value from PUF circuit 200. During time period 352 between times T6 and T8, precharge operations may be performed similarly to precharge operations 316 of FIG. 11. During precharge operations, tristate transistors 342 may be controlled to electrically connect PUF circuit 200 to the cross-coupled latch formed from transistors 344 and 346 (e.g., the tristate control signal may be de-asserted, which enables P-type tristate transistors 342). As shown in FIG. 14, tristate transistors 342 may be enabled so that cross-coupled transistors 344 and 346 assist in precharging nodes N+ and N− to the power supply voltage. If desired, tristate transistors may remain disabled during precharge operations.

At time T8, precharge operations may be complete and precharge transistors 202 and tristate transistors 342 may be disabled in preparation for sensing operations. In other words, nodes N+ and N− may be electrically disconnected from any positive power supply terminals. During time period 354 between times T9 and T11, sensing and amplification operations may be performed by enabling current flow through cross-coupled transistors 204 and 206 (e.g., a sensing phase between times T9 and T10 and an amplification phase between times T10 and T11). At time T9, the sense control signal may be asserted, which enables sense transistors 208 and 210 to allow current flow from nodes N+ and N− to power supply ground through transistors 204, 206, 208, and 210. Transistor variations between cross-coupled transistors 204 and 206 may result in different amounts of current drawn from nodes N+ and N− by the transistors and therefore the voltages at nodes N+ and N− discharge at different rates.

At time T10, tristate transistors 342 may be enabled, which electrically couples nodes N+ and N− to cross-coupled transistors 344 and 346. Cross-coupled transistors 344 and 346 may amplify the difference between the voltages at N+ and N−. In the scenario of FIG. 14, the voltage at node N+ is greater than the voltage at node N− and transistors 344 and 346 on the left branch pull node N+ to the positive power supply voltage and transistors 344 and 346 on the right branch become disabled, allowing transistors 206, 208, and 210 to pull the voltage at N− to the ground power supply voltage at time T11. Conversely, if the voltage at node N+ is less than the voltage at node N− at time T10, current sense amplifier 332 may pull node N− to the positive power supply voltage and node N+ to the ground power supply voltage. Time T10 at which tristate transistors 342 are enabled to activate current sense amplifier 332 may be selected so that at least one of complementary output nodes N+ and N− is pulled to half of the positive power supply voltage. For example, the voltage at node N− is approximately half of the positive power supply voltage at time T10.

Figure 15:
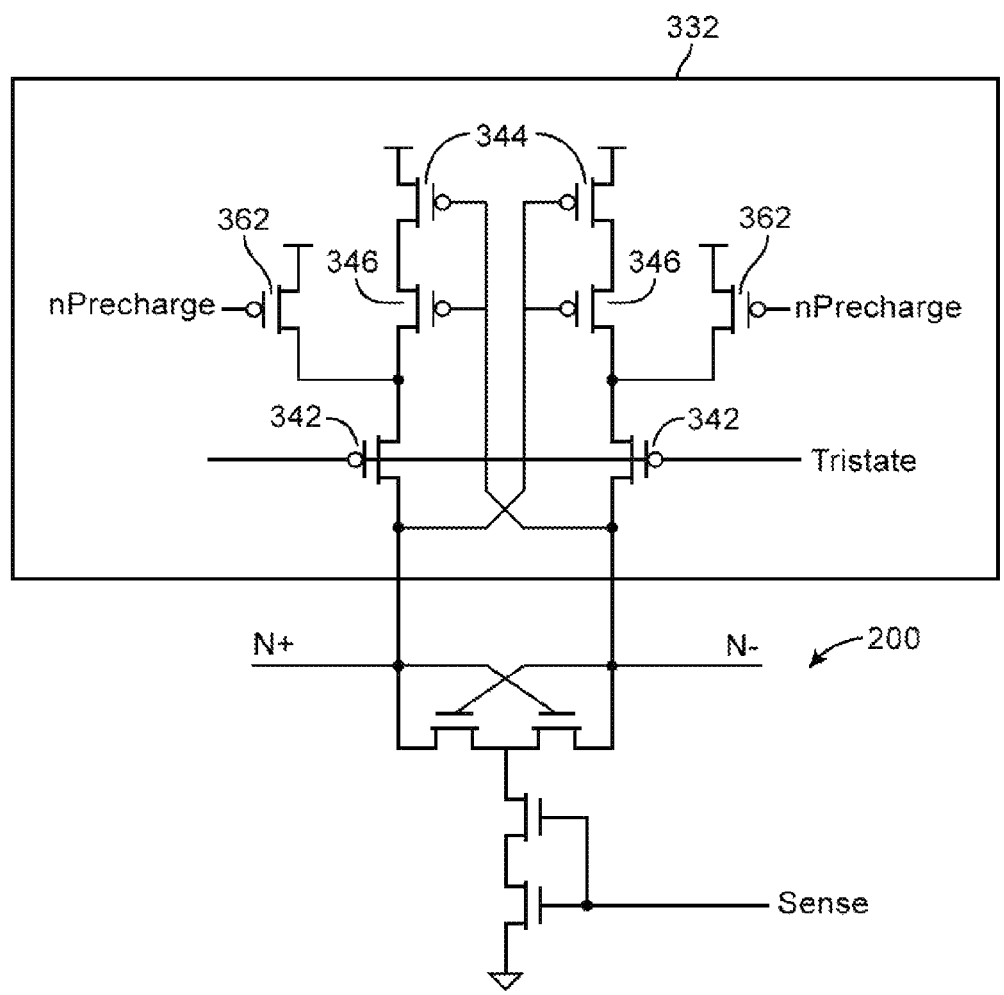
FIG. 15 is an illustrative diagram of an arrangement in which a current sense amplifier having precharge circuitry controlled by tristate circuitry produces an output signal for a stability-enhanced Physically Unclonable Function circuit in accordance with one embodiment of the present invention.

The example of FIG. 13 in which precharge transistors are coupled directly to output nodes N+ and N− is merely illustrative. As shown in FIG. 15, precharge transistors 362 may be coupled to output nodes N+ and N− through tristate transistors 342 (e.g., the drain terminals of precharge transistors 362 may be coupled to the source terminals of tristate transistors 342). In the scenario of FIG. 15, tristate transistors may be enabled together with precharge transistors during precharge operations so that nodes N+ and N− are pulled to a positive power supply voltage through precharge transistors 362 and tristate transistors 342.

Figure 16:
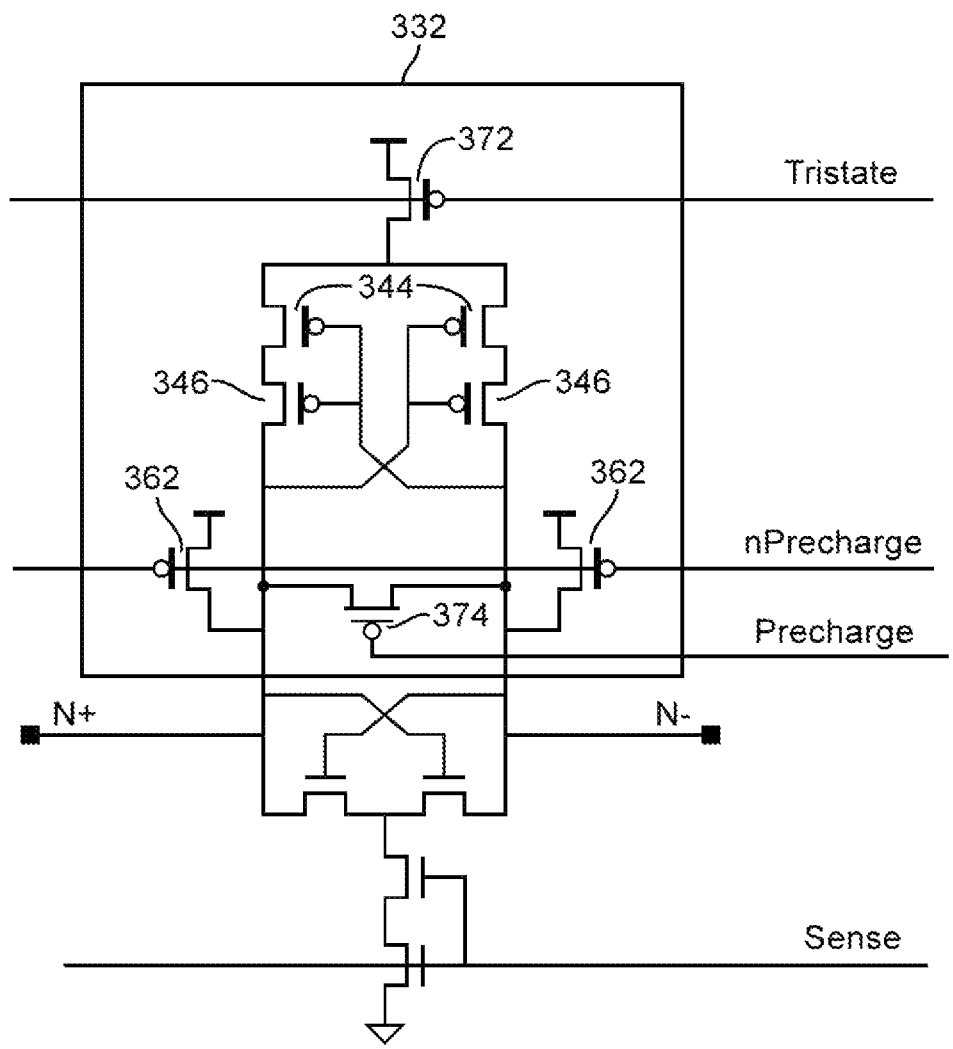
FIG. 16 is an illustrative diagram of an arrangement in which a current sense amplifier having a single tristate transistor produces an output signal for a stability-enhanced Physically Unclonable Function circuit in accordance with one embodiment of the present invention.

As shown in FIG. 16, a tristate transistor 372 may be coupled between a positive power supply terminal and cross-coupled latch transistors 344 (e.g., the source of P-type tristate transistor 372 may be connected to the positive power supply terminal, whereas the drain of the P-type tristate transistor 372 may be connected to the sources of transistors 344). Tristate transistor 372 may be controlled using a tristate control signal similarly to FIG. 13 to electrically disconnect nodes N+ and N− from the positive power supply terminal and tristate transistors 342 of FIG. 13 may therefore be omitted. If desired, a voltage equalizer circuit may be coupled between nodes N+ and N− to help ensure that the precharged voltage at nodes N+ and N− are equal. In the example of FIG. 16, the voltage equalizer circuit is implemented as P-type transistor 374 that is coupled between nodes N+ and N− and controlled by the nPrecharge signal. During precharge operations (e.g., first precharge control signal nPrecharge and second precharge control signal Precharge are de-asserted), P-type transistor 374 may electrically short nodes N+ and N−. After the completion of initial precharge operations (e.g., nPrecharge is asserted to disable precharge transistors 362), the second precharge control signal (i.e., Precharge) may be asserted to disable equalizing transistor 374.

Figure 17:
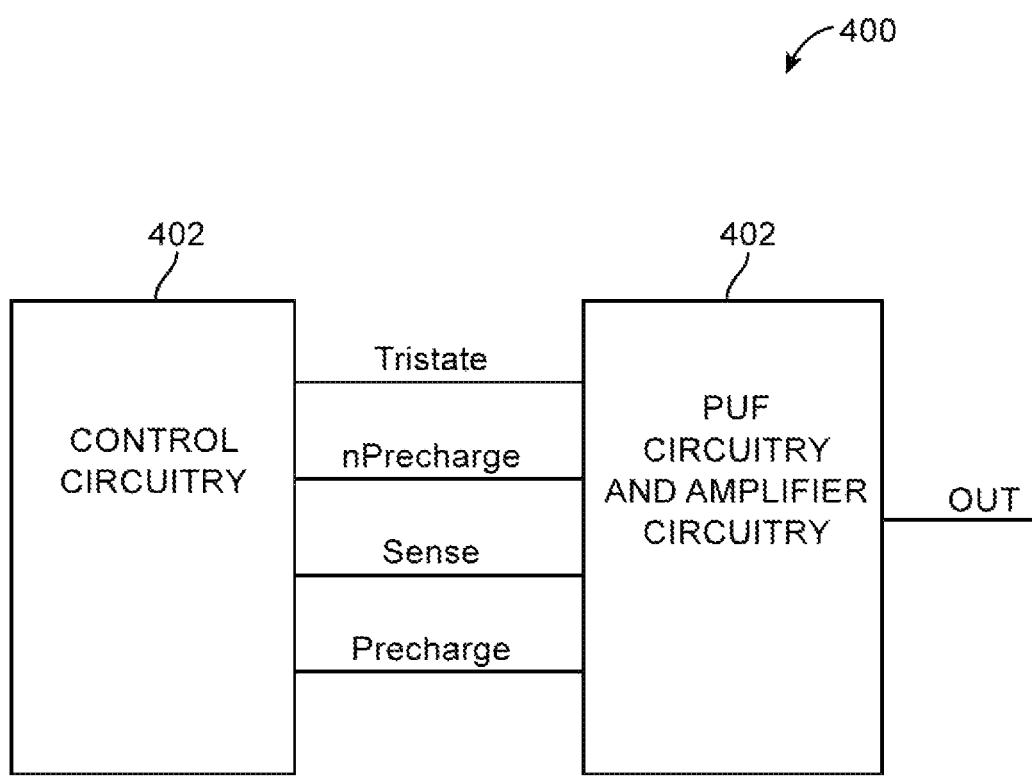
FIG. 17 is an illustrative diagram of control circuitry that may control a stability-enhanced Physically Unclonable Function circuit in accordance with one embodiment of the present invention.

FIG. 17 is an illustrative diagram of circuitry 400 including control circuitry 204 that may control a stability-enhanced Physically Unclonable Function circuit. As shown in FIG. 17, control circuitry 402 may provide control signals such as one or more tristate control signal signals, precharge signals, and sense signals to PUF and amplifier circuitry 402 to produce output signal OUT based on variations such as relative gate threshold variations between a pair of target transistors in circuitry 402. Circuitry 402 may, for example, include PUF circuit 200 of FIG. 2 and/or amplifier circuitry 332 of FIG. 13 or any desired PUF circuitry and amplifier circuitry. If desired, one or more control signals may be omitted or added based on the arrangement of PUF circuitry and amplifier circuitry 402 (e.g., which control signals are needed).

The foregoing is merely illustrative of the principles of this invention and various modifications can be made by those skilled in the art without departing from the scope and spirit of the invention. The foregoing embodiments may be implemented individually or in any combination. As an example, a PUF circuit may include tristate transistors 372 of FIG. 16 in combination with tristate transistors 342 of FIG. 15. The tristate transistors may be controlled using a shared tristate control signal or different tristate control signals.

What is claimed is:

1. Circuitry including a plurality of different circuit element types, the circuitry comprising:
    an output; and
    first and second circuit elements of a given circuit element type that are coupled to the output, wherein the circuitry measures variations between the first and second circuit elements based only on respective currents drawn by the first and second circuits of the given type, and wherein the circuitry produces an output signal at the output having a value that is based on the respective current drawn by one of the first and second circuit elements.

2. The circuitry defined in claim 1 further comprising:
precharge circuitry that precharges the output of the circuitry, wherein the precharge circuitry comprises transistors of a first transistor type and wherein the given circuit element type of the first and second circuit elements comprises a second transistor type that is different from the first transistor type.

3. The circuitry defined in claim 2 wherein the transistors of the first transistor type comprise N-type transistors and wherein the transistors of the second transistor type comprise P-type transistors.

4. The circuitry defined in claim 2 wherein the transistors of the first transistor type comprise P-type transistors and wherein the transistors of the second transistor type comprise N-type transistors.

5. The circuitry defined in claim 2 wherein the output comprises a differential output having first and second output nodes, wherein the first circuit element is coupled to the first output node, and wherein the second circuit element is coupled to the second output node.

6. The circuitry defined in claim 5 wherein the precharge circuitry comprises first and second P-type transistors that precharge the first and second output nodes to a positive power supply voltage.

7. The circuitry defined in claim 6 wherein the first circuit element comprises a first N-type transistor, wherein the second circuit element comprises a second N-type transistor, and wherein the first and second N-type transistors are cross-coupled.

8. The circuitry defined in claim 7 wherein first and second N-type transistors pull the first and second output nodes toward a ground power supply voltage and wherein the circuitry generates the output signal at the differential output based on variations between the first and second N-type transistors.

9. The circuitry defined in claim 8 further comprising:
at least one sense transistor coupled between the cross-coupled N-type transistors and a ground power supply terminal, wherein the sense transistor is controlled by a sense control signal.

10. The circuitry defined in claim 9 wherein the at least one sense transistor comprises a pair of stacked sense transistors that are controlled by the sense control signal.

11. The circuitry defined in claim 9 further comprising:
an address transistor coupled between the cross-coupled transistors and the sense transistor.

12. The circuitry defined in claim 5 further comprising:
first and second transistor-based capacitors coupled to the first and second output nodes.

13. The circuitry defined in claim 5 further comprising:
a sense amplifier coupled to the output nodes, wherein the sense amplifier produces an output signal that uniquely identifies the circuitry.

14. A method of operating a Physically Unclonable Function circuit that includes transistors, the method comprising:
with precharging circuitry having a first subset of the transistors of a first type, precharging an output; and
with circuitry having a second subset of the transistors of a second type that is different from the first type, producing a signal at the output based on variations between the transistors in the second subset of the transistors of the second type.

15. The method defined in claim 14 wherein the output comprises a differential output having first and second output nodes, wherein the signal comprises a differential signal at the first and second output nodes, the method further comprising:
with a sense amplifier coupled to the first and second output nodes, producing an output signal based on the differential signal.

16. The method defined in claim 15 wherein the sense amplifier comprises a voltage sense amplifier and wherein producing the output signal based on the differential signal comprises amplifying a difference between voltages at the first and second output nodes.

17. The method defined in claim 15 wherein the sense amplifier comprises a current sense amplifier having tristate circuitry and wherein producing the output signal based on the differential signal comprises:
with the tristate circuitry, disabling the current sense amplifier while the differential signal is being produced by the circuitry having only transistors of a second type; and
with the tristate circuitry, enabling the current sense amplifier to produce the output signal from the differential signal.

18. Circuitry, comprising:
a pair of target transistors of a first transistor type, wherein the pair of target transistors has drain terminals coupled to respective first and second complementary nodes, gate terminals cross-coupled to the first and second complementary nodes, and source terminals coupled to a common sink node;
a discharge path coupled between the common sink node and a ground power supply terminal;
a pair of precharge transistors of a second transistor type, wherein drain terminals of the pair of precharge transistors are coupled to the first and second complementary nodes and wherein source terminals of the precharge transistors are coupled to a common source node; and
control circuitry that sequentially disables the discharge path, enables the pair of precharge transistors, and disables the pair of precharge transistors to precharge the first and second complementary nodes during a precharge phase and, during a sensing phase, enables the discharge path to measure relative gate threshold variations between the pair of target transistors, wherein current through the complementary nodes during the sensing phase only flows through the pair of target transistors and the discharge path.

19. The circuitry defined in claim 18 wherein the discharge path comprises a sense pass-gate transistor having a gate terminal that receives a sense signal from the control circuitry, wherein the control circuitry disables the discharge path by de-asserting the sense signal and enables the discharge path by asserting the sense signal, wherein gate terminals of the precharge transistors receive a precharge signal from the control circuitry, and wherein the control circuitry enables the pair of precharge transistors by de-asserting the precharge signal and disables the pair of precharge transistors by asserting the precharge signal.

20. The circuitry defined in claim 18 further comprising:
an equalizing transistor of the second transistor type, wherein the equalizing transistor has a source terminal coupled to the first complementary node and a drain terminal coupled to the second complementary node, wherein the control circuitry enables the equalizing transistor subsequent to disabling the discharge path during the precharge phase and wherein the control circuitry disables the equalizing transistor subsequent to disabling the pair of precharge transistors during the precharge phase.

21. The circuitry defined in claim 18 wherein the first and second complementary nodes are coupled to respective first and second sense amplifier inputs of a differential sense amplifier.

22. The circuitry defined in claim 21 wherein the differential sense amplifier comprises a voltage sense amplifier and wherein the first and second sense amplifier inputs comprise high-impedance inputs.

23. The circuitry defined in claim 21 wherein the differential sense amplifier comprises a current sense amplifier that amplifies a difference in voltage between the first and second sense amplifier inputs by receiving current from the first and second complementary nodes through the first and second sense amplifier inputs.

24. The circuitry defined in claim 23 wherein the first and second complementary nodes are coupled to the first and second sense amplifier inputs by first and second tristating pass gates, wherein gate terminals of the first and second tristating pass gates receive a tristate control signal from the control circuitry, wherein the control circuitry disables the first and second tristating pass gates during the sensing phase, and wherein the control circuitry enables the first and second tristating pass gates at completion of the sensing phase.

25. The circuitry defined in claim 23 wherein the current sense amplifier comprises:
first and second amplifying transistors of the second transistor type, wherein a drain terminal of the first amplifying transistor is coupled to the first sense amplifier input, wherein a drain terminal of the second amplifying transistor is coupled to the second sense amplifier input, wherein a gate terminal of the first amplifying transistor is coupled to the second sense amplifier input, wherein a gate terminal of the second amplifying transistor is coupled to the first sense amplifier input, and wherein source terminals of the first and second amplifying transistors are coupled to a common sense amplifier node.

26. The circuitry defined in claim 25 wherein the common sense amplifier node is coupled to a positive power supply terminal through third tristating pass gate, wherein a gate of the third tristating pass gate receives a second tristate control signal from the control circuitry, wherein the control circuitry disables the third tristating pass gate during the sensing phase and enables the third tristating pass gate at the completion of the sensing phase.

* * * * *